(12) United States Patent
Kapolnek et al.

(10) Patent No.: US 11,059,406 B1
(45) Date of Patent: Jul. 13, 2021

(54) HEAD RESTRAINT WITH AUXILARY POWER

(71) Applicant: GM Global Technology Operations LLC, Detroit, MI (US)

(72) Inventors: Gerard Kapolnek, Carleton, MI (US); Chad C. Cairns, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/797,637

(22) Filed: Feb. 21, 2020

(51) Int. Cl.
*B60N 2/879* (2018.01)
*B60N 2/897* (2018.01)

(52) U.S. Cl.
CPC ............ *B60N 2/879* (2018.02); *B60N 2/897* (2018.02)

(58) Field of Classification Search
CPC ........ B60N 2/879; B60N 2/897; B60N 2/809; B60N 2/815; B60N 2/90; B60N 2002/0264; B60N 2002/899; B60N 3/00
See application file for complete search history.

(56) References Cited

U.S. PATENT DOCUMENTS

| | | | | |
|---|---|---|---|---|
| 6,217,118 B1* | 4/2001 | Heilig | ..................... | B60N 2/427 297/410 |
| 6,224,158 B1* | 5/2001 | Hann | ..................... | B60N 2/809 297/391 |
| 6,471,296 B2* | 10/2002 | Lance | ..................... | A47C 7/38 297/410 |
| 6,554,437 B2* | 4/2003 | von Glasow | ....... | B60R 11/0241 359/872 |
| 6,572,186 B1* | 6/2003 | Fischer | ................. | B60N 2/818 297/216.12 |
| 7,677,910 B2* | 3/2010 | Yoshida | ................... | H01R 9/16 439/246 |
| 7,753,708 B2* | 7/2010 | Yoshida | ............. | H01R 13/6271 439/345 |
| 7,874,858 B2* | 1/2011 | Atsumi | .................... | H01R 9/03 439/248 |
| 8,109,569 B2* | 2/2012 | Mitchell | ................ | B60N 2/879 297/217.3 |
| 8,109,570 B2* | 2/2012 | Nishiura | ................ | B60N 2/818 297/217.3 |
| 8,167,376 B2* | 5/2012 | Song | ...................... | B60N 2/815 297/410 |
| 8,348,338 B2* | 1/2013 | Galecka | ................. | B60N 2/809 297/216.12 |
| 8,556,342 B2* | 10/2013 | Tache | ...................... | A47C 7/72 297/217.3 |
| 9,139,139 B2* | 9/2015 | Mitchell | ................ | B60N 2/879 |
| 9,150,171 B2* | 10/2015 | Kim | ........................ | B60N 2/79 |
| 9,584,890 B1* | 2/2017 | Tuccinardi | ............ | B60N 2/879 |
| 9,802,519 B2* | 10/2017 | Subat | .................... | B60N 2/821 |
| 10,035,443 B1* | 7/2018 | Sayed | .................... | B60N 2/879 |
| 10,290,984 B2* | 5/2019 | Salvia, III | ............... | B60N 2/90 |
| 10,434,953 B2* | 10/2019 | Mitchell | ................ | B60N 2/815 |
| 10,477,303 B1* | 11/2019 | Kapolnek | ............. | H04R 1/403 |

(Continued)

*Primary Examiner* — James M Ference

(57) ABSTRACT

A seat assembly for an automobile includes a seat back, a sleeve mounted within the seat back, a head restraint, the head restraint including a support post extending therefrom, the sleeve adapted to receive the support post to support the head restraint on the seat back, and a guide cap mounted onto the sleeve adjacent an external surface of the seat back, the guide cap including an electrical port.

10 Claims, 3 Drawing Sheets

(56) References Cited

U.S. PATENT DOCUMENTS

| | | | | |
|---|---|---|---|---|
| 2003/0025367 A1* | 2/2003 | Boudinot | B60N 2/879 | 297/217.3 |
| 2004/0021350 A1* | 2/2004 | House | B60R 11/0217 | 297/217.4 |
| 2005/0223406 A1* | 10/2005 | Vitito | G11B 17/05 | 725/77 |
| 2005/0235326 A1* | 10/2005 | Vitito | B60R 11/0211 | 725/77 |
| 2005/0235327 A1* | 10/2005 | Vitito | B60R 11/0211 | 725/77 |
| 2005/0242604 A1* | 11/2005 | Bonnes | B60N 2/0818 | 296/35.1 |
| 2006/0047426 A1* | 3/2006 | Vitito | B60R 11/0211 | 701/469 |
| 2006/0061188 A1* | 3/2006 | Locke | B60N 2/824 | 297/410 |
| 2006/0070102 A1* | 3/2006 | Vitito | B60K 37/06 | 725/77 |
| 2006/0284435 A1* | 12/2006 | Vitito | B60N 2/5635 | 296/1.07 |
| 2008/0048479 A1* | 2/2008 | Yoshida | H01R 13/627 | 297/410 |
| 2008/0057774 A1* | 3/2008 | Yoshida | H01R 13/64 | 439/374 |
| 2009/0246978 A1* | 10/2009 | Hofmockel | B60N 2/809 | 439/34 |
| 2009/0315368 A1* | 12/2009 | Mitchell | B60R 11/0211 | 297/188.04 |
| 2011/0167460 A1* | 7/2011 | Tranchina | H04N 21/426 | 725/75 |
| 2012/0086247 A1* | 4/2012 | Liu | B60N 2/879 | 297/217.3 |
| 2012/0125959 A1* | 5/2012 | Kucera | B60N 2/879 | 224/275 |
| 2012/0127643 A1* | 5/2012 | Mitchell | B60N 2/815 | 361/679.01 |
| 2012/0162891 A1* | 6/2012 | Tranchina | H04N 1/00347 | 361/679.26 |
| 2013/0264851 A1* | 10/2013 | Kim | B60N 2/879 | 297/217.3 |
| 2014/0077539 A1* | 3/2014 | Brawner | B60R 11/0229 | 297/217.3 |
| 2014/0077576 A1* | 3/2014 | Brawner | B60R 11/02 | 297/463.1 |
| 2014/0237518 A1* | 8/2014 | Liu | B60N 2/818 | 725/75 |
| 2015/0381941 A1* | 12/2015 | Watkins | G07C 5/008 | 348/148 |
| 2016/0059793 A1* | 3/2016 | Mitchell | B60N 2/80 | 224/275 |
| 2017/0267137 A1* | 9/2017 | Subat | B60N 2/64 | |
| 2020/0231076 A1* | 7/2020 | Kapolnek | B60N 2/879 | |
| 2020/0260167 A1* | 8/2020 | Gayon | H04R 1/025 | |

\* cited by examiner

HEAD RESTRAINT WITH AUXILARY POWER

INTRODUCTION

The present disclosure relates to a seat assembly for an automobile having a head restraint with an auxiliary power port.

In automobiles, often power ports are included to allow occupants of the automobile to charge personal electronic devices such as cell phones, hand-held gaming consoles or computer tablets. Unfortunately, often such power ports are inconveniently located and awkward to use.

Thus, while current auxiliary power ports within automobiles achieve their intended purpose, there is a need for a new and improved auxiliary power port within an automobile.

SUMMARY

According to several aspects of the present disclosure, a seat assembly for an automobile includes a seat back, a sleeve mounted within the seat back, a head restraint, the head restraint including a support post extending therefrom, the sleeve adapted to receive the support post to support the head restraint on the seat back, and a guide cap mounted onto the sleeve adjacent an external surface of the seat back, the guide cap including an electrical port.

According to another aspect, the sleeve includes a pigtail extending therefrom, the pigtail adapted to connect to a power source within the seat back and provide electrical power to the sleeve.

According to another aspect, the pigtail includes an electrical connector adapted to connect to a power source within the seat back, electrical contacts mounted onto the sleeve, and electrical wires extending between the electrical connector and the electrical contacts.

According to another aspect, the electrical contacts of the sleeve are made from an electrically conductive material.

According to another aspect, the electrical port within the guide cap includes electrical leads, and when the guide cap is positioned onto the sleeve, the electrical leads of the electrical port contact the electrical contacts of the sleeve such that power from a power source within the seat back is conducted through the pigtail to the electrical contacts and to the electrical leads of the electrical port.

According to another aspect, the guide cap is removably attached to the sleeve.

According to another aspect, the guide cap is removably attached to the sleeve by a twist-lock feature.

According to another aspect, the electrical port is adapted to provide low-voltage power suitable for personal electronic devices.

According to another aspect, the electrical port is a USB port.

According to another aspect, the seat back includes an internal frame, the internal frame including features adapted to support the sleeve within the seat back.

According to another aspect, the seat back includes two sleeves mounted within the seat back, the head restraint includes two support post extending therefrom, one support post being received within each of the two sleeves, and a guide cap mounted onto each of the sleeve adjacent an external surface of the seat back, each guide cap including an electrical port.

According to several aspects of the present disclosure, a sleeve assembly adapted to support a head restraint on an automotive seat includes a sleeve adapted to be mounted within a seat back of the automotive seat, the sleeve adapted to receive a support post of a head restraint, and a guide cap mounted onto the sleeve, the guide cap including an electrical port.

According to another aspect, the sleeve assembly further includes a pigtail extending from the sleeve, the pigtail adapted to connect to a power source within a seat back to provide electrical power to the sleeve.

According to another aspect, the pigtail includes an electrical connector adapted to connect to a power source within a seat back, electrical contacts mounted onto the sleeve, and electrical wires extending between the electrical connector and the electrical contacts.

According to another aspect, the electrical contacts of the sleeve are made from an electrically conductive material.

According to another aspect, the electrical port within the guide cap includes electrical leads, and when the guide cap is positioned onto the sleeve, the electrical leads of the electrical port contact the electrical contacts of the sleeve such that power from a power source is conducted through the pigtail to the electrical contacts and to the electrical leads of the electrical port.

According to another aspect, the guide cap is removably attached to the sleeve.

According to another aspect, the guide cap is removably attached to the sleeve by a twist-lock feature.

According to another aspect, the electrical port is a USB port adapted to provide low-voltage power suitable for personal electronic devices.

According to several aspects of the present disclosure, a seat assembly for an automobile includes a seat back including an inner frame, a pair of sleeves mounted onto the inner frame within the seat back, each of the sleeves including electrical contacts that are made from an electrically conductive material, a head restraint, the head restraint including a pair of support posts extending therefrom, each sleeve adapted to receive one of the support posts to support the head restraint on the seat back, a guide cap removably mounted onto each of the sleeves adjacent an external surface of the seat back by a twist-lock feature, each guide cap including a USB port and electrical leads extending from the USB port, and a pigtail extending from each of the sleeves adapted to connect to a power source within the seat back, the pigtails including an electrical connector adapted to connect to a power source within the seat back and electrical wires extending between the electrical connector and the electrical contacts on the sleeves, wherein when the guide caps are positioned onto the sleeves, the electrical leads of the USB ports contact the electrical contacts of the sleeves such that power from a power source within the seat back is conducted through the pigtails to the electrical contacts and to the electrical leads of the USB ports.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
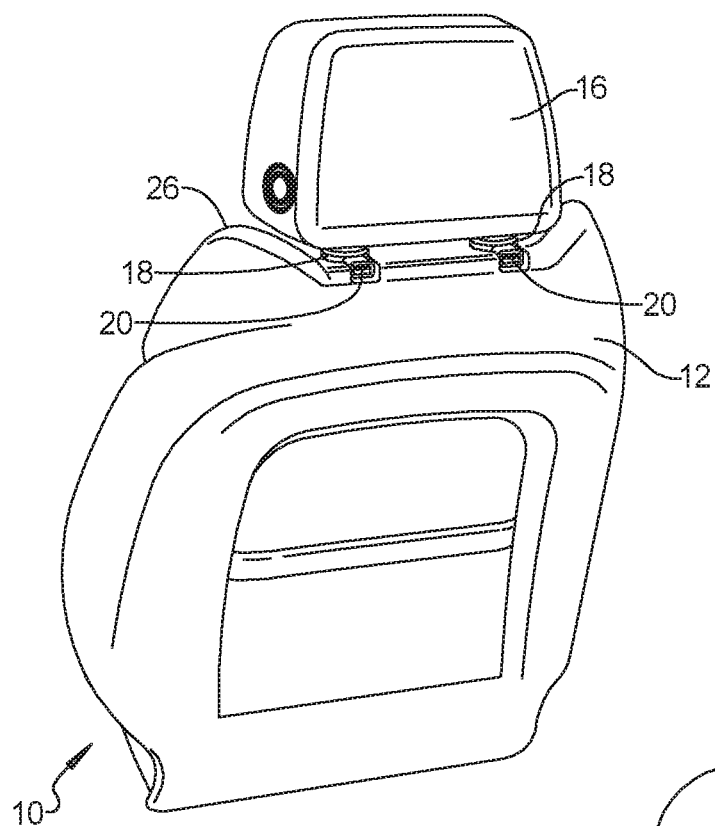
FIG. 1 is a perspective view of a seat assembly for an automobile according to an exemplary embodiment.
Figure 2:
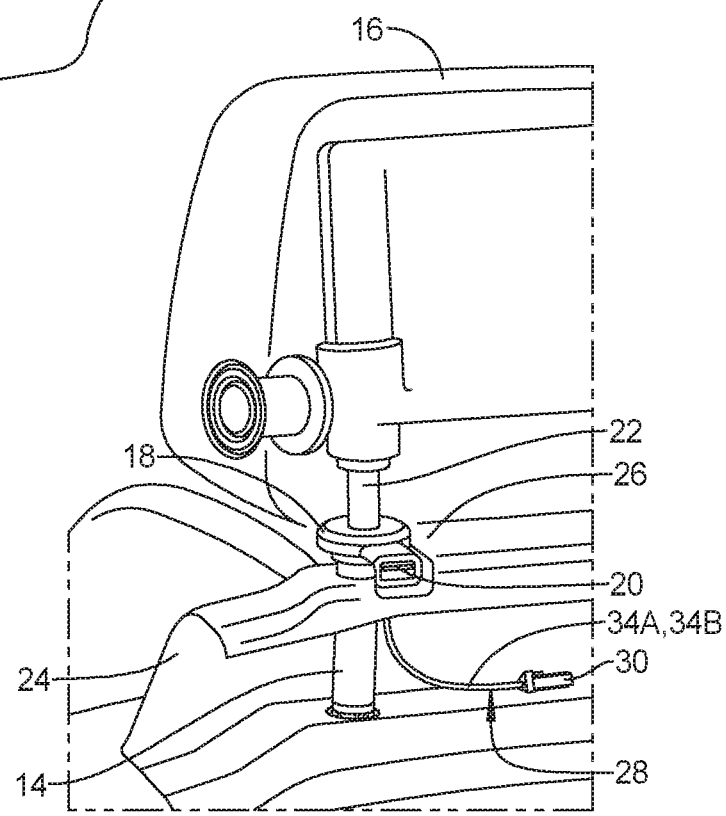
FIG. 2 is a transparent perspective view of a seat assembly for an automobile according to an exemplary embodiment.

Referring to FIG. 1, a seat assembly for an automobile in accordance with the present disclosure is shown generally at 10. Referring to FIG. 1 and FIG. 2, the seat assembly 10 includes a seat back 12, a sleeve 14 mounted within the seat back 12, a head restraint 16, a guide cap 18, and an electrical port 20 mounted within the guide cap 18.

In the exemplary embodiment shown, the seat back 12 includes two sleeves 14 and the head restraint 16 includes two support posts 22 extending therefrom. The seat back 12 includes an internal frame 24. The internal frame 24 includes features adapted to support the sleeves 14 within the seat back 12.

Each of the sleeves 14 is adapted to receive one of the support posts 22 to support the head restraint 16 on the seat back 12. A guide cap 18 is mounted onto each of the sleeves 14 adjacent an external surface 26 of the seat back 12. Each of the guide caps 18 includes an electrical port 20.

Figure 3:
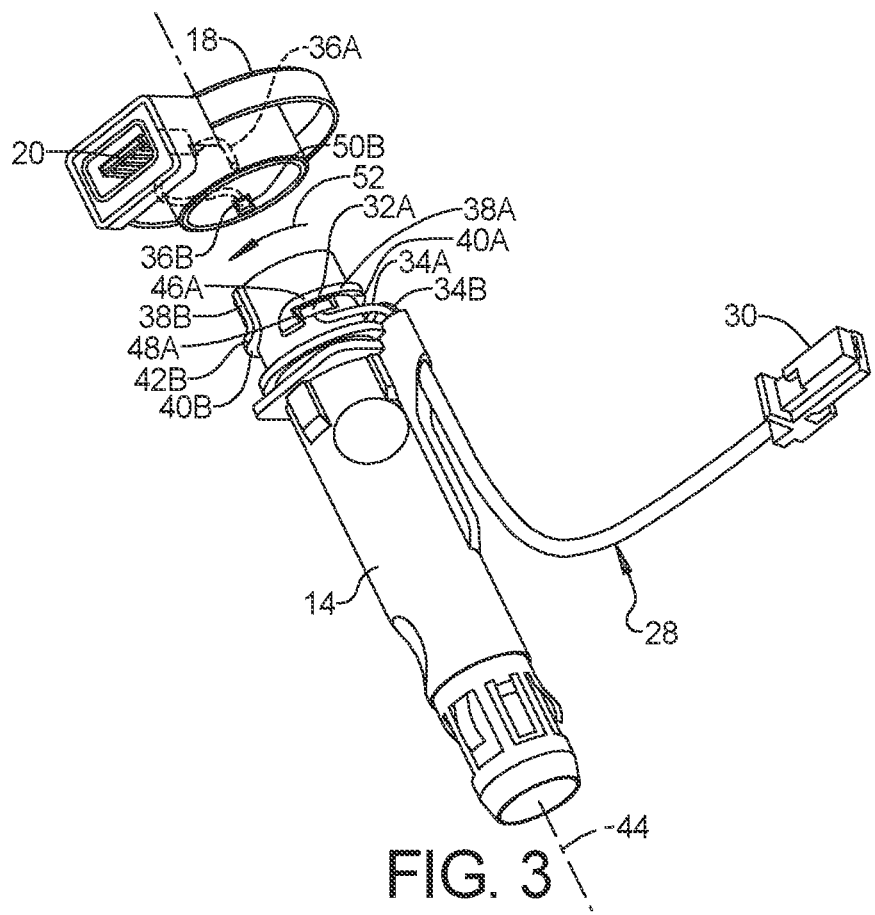
FIG. 3 is an exploded view of a sleeve assembly for an automotive seat according to an exemplary embodiment.
Figure 4:
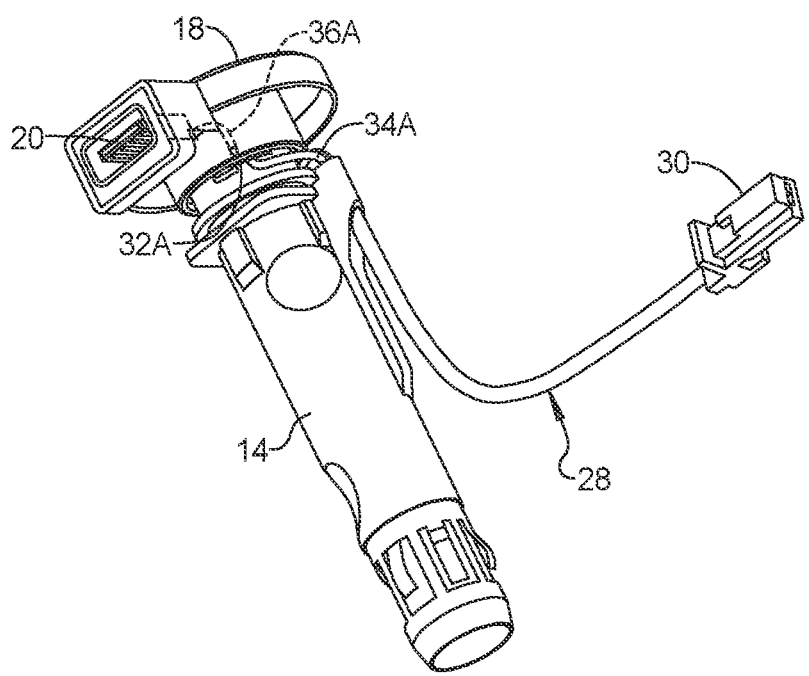
FIG. 4 is an assembled view of the sleeve assembly shown in FIG. 3.

Referring to FIG. 3 and FIG. 4, a pigtail 28 extends from each sleeve 14. The pigtails 28 are adapted to connect to a power source within the seat back 12 and provide electrical power to the sleeves 14. In an exemplary embodiment, the pigtails 28 include an electrical connector 30 that is adapted to connect to a power source within the seat back 12. The electrical connector 30 may be any suitable electrical connector for the application. As shown the electrical connector 30 is a male connector adapted to be received within a corresponding female port. As shown, the electrical connector 30 includes features that lock the electrical connector 30 within a female port to ensure the electrical connector 30 does not become dis-connected once plugged into the female port.

Each pigtail 28 further includes electrical contacts 32A, 32B mounted onto the respective sleeve 14, and electrical wires 34A, 34B extending between the electrical connector 30 and the electrical contacts 32A, 32B. The electrical contacts 32A, 32B mounted onto the sleeves 14 are made from an electrically conductive material.

The electrical ports 20 within the guide caps 18 include electrical leads 36A, 36B. When each guide cap 18 is positioned onto one of the sleeves 14, the electrical leads 36A, 36B of the electrical port 20 contact the electrical contacts 32A, 32B of the sleeve 14 such that power from a power source within the seat back 12 is conducted through the pigtail 28 to the electrical contacts 32A, 32B and to the electrical leads 36A, 36B of the electrical port 20.

In an exemplary embodiment, the guide caps 18 are removably attached to the sleeves 14. As shown, the guide caps 18 are removably attached to the sleeves 14 by a twist-lock feature. When the guide caps 18 are twist-locked onto the sleeves 14, the electrical leads 36A, 36B of the electrical ports 20 are held in contact with the electrical contacts 32A, 32B to complete an electric path from the electrical port 20 to the electrical connector 30 of the pigtail 28.

Figure 5:
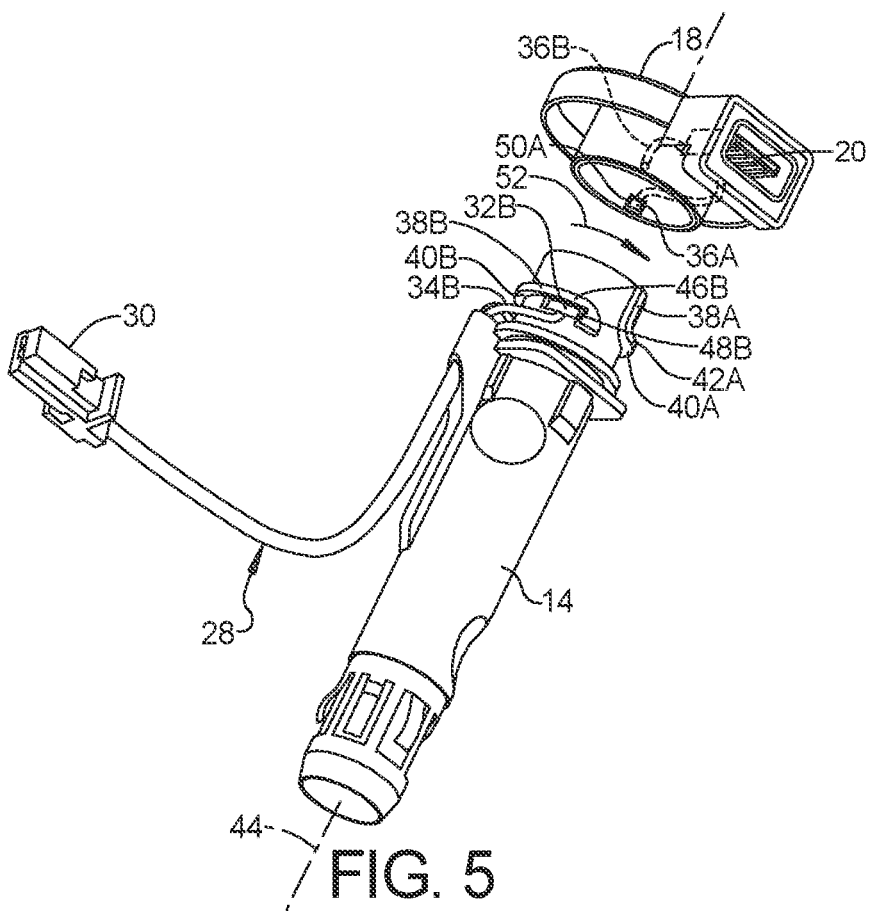
FIG. 5 is a rotated view of FIG. 3.
Figure 6:
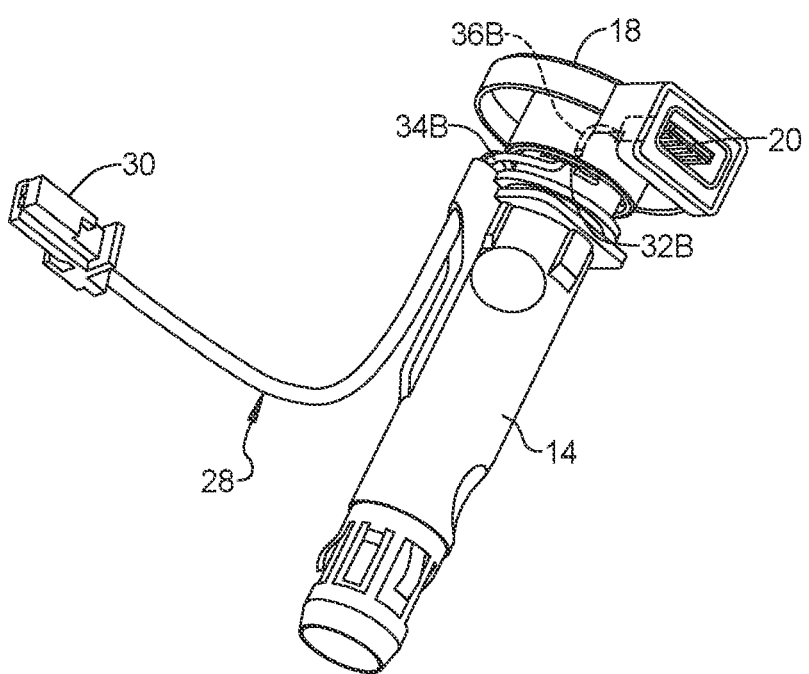
FIG. 6 is a rotated view of FIG. 4.

As shown in FIG. 3 and FIG. 4, the pigtail 28 includes a pair of electrical wires 34A, 34B. A first electrical wire 34A connects to a first electrical contact 32A. When the guide cap 18 is placed onto the sleeve 14, a first electrical lead 36A from the electrical port 20 contacts the first electrical contact 32A, as shown in FIG. 4. Referring to FIG. 5 and FIG. 6, similarly, a second electrical wire 34B connects to a second electrical contact 32B on an opposite side of the sleeve 14. When the guide cap 18 is placed onto the sleeve 14, a second electrical lead 36B from the electrical port 20 contacts the second electrical contact 32B.

In an exemplary embodiment, the sleeve 14 includes first and second radially outwardly extending ridges 38A, 38B that define first and second axially facing ramped surfaces 40A, 40B. The first ramped surface 40A includes a first section 42A that is angled relative to a central axis 44 of the sleeve 14, a second section 46A that is perpendicular to the central axis 44 of the sleeve 14, and a stop 48A. The second ramped surface 40B includes a first section 42B that is angled relative to the central axis 44 of the sleeve 14, a second section 46B that is perpendicular to the central axis 44 of the sleeve 14, and a stop 48B. The guide cap 18 includes first and second radially inwardly extending nubs 50A, 50B. When the guide cap 18 is placed onto the sleeve 14 and twisted, the first nub 50A of the guide cap 18 engages the first ramped surface 40A of the sleeve 14 and the second nub 50B of the guide cap 18 engages the second ramped surface 40B of the sleeve 14. As the guide cap 18 is twisted, as indicated by arrow 52, the first and second nubs 50A, 50B follow the first and second ramped surfaces 40A, 40B of the sleeve 14 until the first and second nubs 50A, 50B engage the stops 48A, 48B.

The first sections 42A, 42B of the first and second ramped surfaces 40A, 40B pull the guide cap 18 axially onto the sleeve 14 as the guide cap 18 is twisted. The second sections 46A, 46B of the first and second ramped surfaces 40A, 40B provide a perpendicular axial surface to hold the guide cap 18 axially onto the sleeve 14. The stops 48A, 48B of the first and second ramped surfaces 40A, 40B provide a positive stop to prevent further rotation of the guide cap 18.

One of the electrical leads 36A is positioned within the first nub 50A, and the other one of the electrical leads 36B is positioned within the second nub 50B. One of the electrical contacts 32A of the sleeve 14 is positioned immediately adjacent the second section 46A and the stop 48A of the first ramped surface 40A, and the other one of the electrical contacts 32B of the sleeve 14 is positioned immediately adjacent the second section 46B and the stop 48B of the second ramped surface 40B. When the guide cap 18 is placed onto the sleeve 14, the electrical leads 36A, 36B engage the electrical contacts 32A, 32B and the electrical port 20 is automatically connected to the electrical contacts 32A, 32B.

The electrical port 20 is adapted to provide low-voltage power suitable for personal electronic devices. As shown, the electrical port 20 is a universal serial bus, or USB port. It should be understood that the electrical port 20 may be any type of electrical port suitable for supplying power to personal electronic devices. By way of non-limiting example, the electrical port 20 may be a USB Type A, USB Type B, USB Type C, USB 1.1, USB 2.0, USB 3.0, USB 3.1, USB 4, USB Micro-A, USB 2.0 Micro-A, USB 3.0 Micro-B, USB Mini-A and USB Mini-B.

A seat assembly 10 of the present disclosure offers an electrical port 20 to allow passengers in an automobile to plug in personal electronic devices. The electrical port 20 is located within the guide cap 18 for the head restraint 16, so the electrical port 20 is positioned close to eye-level, allowing the passenger to easily see and access the electrical port 20. Further, the electrical port 20 of the present disclosure is located at an elevation within the automobile that will reduce the amount of contamination that may enter the electrical port 20. Devices that are plugged into the electrical port 20 can be placed within pockets formed in the seat back 12 and power cords will not be stretched across the floor of the automobile where they can become entangled with passenger's feet and luggage. Additionally, power cords will not be draped across the seating space between or across other passengers. Passenger can move about within the automobile as well as enter and exit the automobile without the risk of becoming entangled with power cords.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A seat assembly for an automobile, comprising:
a seat back;
a sleeve mounted within the seat back;
a pigtail extending from the sleeve, the pigtail adapted to connect to a power source within the seat back and provide electrical power to the sleeve and including an electrical connector adapted to connect to a power source within the seat back, electrical contacts mounted onto the sleeve, and electrical wires extending between the electrical connector and the electrical contacts;
a head restraint, the head restraint including a support post extending therefrom, the sleeve adapted to receive the support post to support the head restraint on the seat back; and
a guide cap mounted onto the sleeve adjacent an external surface of the seat back, the guide cap including an electrical port having electrical leads, and when the guide cap is positioned onto the sleeve, the electrical leads of the electrical port contact the electrical contacts of the sleeve such that power from a power source within the seat back is conducted through the pigtail to the electrical contacts and to the electrical leads of the electrical port;
wherein, the sleeve includes a radially outwardly extending ridge defining an axially facing ramped surface, the ramped surface having a first section angled relative to a central axis of the sleeve, a second section that is perpendicular to the central axis of the sleeve, and a stop, and the guide cap includes a radially inwardly extending nub such that when the guide cap is placed onto the sleeve and twisted, the nub of the guide cap engages the ramped surface of the sleeve and follows the ramped surface of the sleeve as the guide cap is twisted until the nub engages the stop;
the electrical leads of the electrical port being positioned within the nub and the electrical contacts of the sleeve being positioned immediately adjacent the ramped surface and the stop, wherein when the guide cap is placed onto the sleeve, the electrical leads engage the electrical contacts and the electrical port is automatically connected to the electrical contacts.

2. The seat assembly of claim 1, wherein the electrical contacts of the sleeve are made from an electrically conductive material.

3. The seat assembly of claim 1, wherein the electrical port is adapted to provide low-voltage power suitable for personal electronic devices.

4. The seat assembly of claim 1, wherein the electrical port is a USB port.

5. The seat assembly of claim 1, wherein the seat back includes an internal frame, the internal frame including features adapted to support the sleeve within the seat back.

6. The seat assembly of claim 1, wherein:
the seat back includes a second sleeve mounted within the seat back;
the head restraint includes a second support post extending therefrom, the second support post being received within the second sleeve; and
a second guide cap mounted onto the second sleeve adjacent an external surface of the seat back, and including an electrical port.

7. A sleeve assembly adapted to support a head restraint on an automotive seat, comprising:
a sleeve adapted to be mounted within a seat back of the automotive seat, the sleeve adapted to receive a support post of a head restraint;
a pigtail extending from the sleeve, the pigtail adapted to connect to a power source within the seat back and provide electrical power to the sleeve and including an electrical connector adapted to connect to a power source within the seat back, electrical contacts mounted onto the sleeve, and electrical wires extending between the electrical connector and the electrical contacts; and
a guide cap mounted onto the sleeve, the guide cap including an electrical port, having electrical leads, and when the guide cap is positioned onto the sleeve, the electrical leads of the electrical port contact the electrical contacts of the sleeve such that power from a power source within the seat back is conducted through the pigtail to the electrical contacts and to the electrical leads of the electrical port;
wherein, the sleeve includes a radially outwardly extending ridge defining an axially facing ramped surface, the ramped surface having a first section angled relative to a central axis of the sleeve, a second section that is perpendicular to the central axis of the sleeve, and a stop, and the guide cap includes a radially inwardly extending nub such that when the guide cap is placed onto the sleeve and twisted, the nub of the guide cap engages the ramped surface of the sleeve and follows the ramped surface of the sleeve as the guide cap is twisted until the nub engages the stop;
the electrical leads of the electrical port being positioned within the nub and the electrical contacts of the sleeve being positioned immediately adjacent the ramped surface and the stop, wherein when the guide cap is placed onto the sleeve, the electrical leads engage the electrical contacts and the electrical port is automatically connected to the electrical contacts.

8. The sleeve assembly of claim 7, wherein the electrical contacts of the sleeve are made from an electrically conductive material.

9. The seat assembly of claim 7, wherein the electrical port is a USB port adapted to provide low-voltage power suitable for personal electronic devices.

10. A seat assembly for an automobile, comprising:
a seat back including an inner frame;

a pair of sleeves mounted onto the inner frame within the seat back, each of the sleeves including electrical contacts that are made from an electrically conductive material;

a head restraint, the head restraint including a pair of support posts extending therefrom, each sleeve adapted to receive one of the support posts to support the head restraint on the seat back;

a guide cap removably mounted onto each of the sleeves adjacent an external surface of the seat back, each guide cap including a USB port and electrical leads extending from the USB port; and a pigtail extending from each of the sleeves adapted to connect to a power source within the seat back, the pigtails including an electrical connector adapted to connect to a power source within the seat back and electrical wires extending between the electrical connector and the electrical contacts on the sleeves;

wherein when the guide caps are positioned onto the sleeves, the electrical leads of the USB ports contact the electrical contacts of the sleeves such that power from a power source within the seat back is conducted through the pigtails to the electrical contacts and to the electrical leads of the USB ports;

wherein, the sleeve includes a radially outwardly extending ridge defining an axially facing ramped surface, the ramped surface having a first section angled relative to a central axis of the sleeve, a second section that is perpendicular to the central axis of the sleeve, and a stop, and the guide cap includes a radially inwardly extending nub such that when the guide cap is placed onto the sleeve and twisted, the nub of the guide cap engages the ramped surface of the sleeve and follows the ramped surface of the sleeve as the guide cap is twisted until the nub engages the stop;

the electrical leads of the electrical port being positioned within the nub and the electrical contacts of the sleeve being positioned immediately adjacent the ramped surface and the stop, wherein when the guide cap is placed onto the sleeve, the electrical leads engage the electrical contacts and the electrical port is automatically connected to the electrical contacts.

\* \* \* \* \*